March 8, 1960 R. B. LAWRANCE ET AL 2,928,042
HIGH VACUUM DEVICE
Filed Dec. 6, 1955
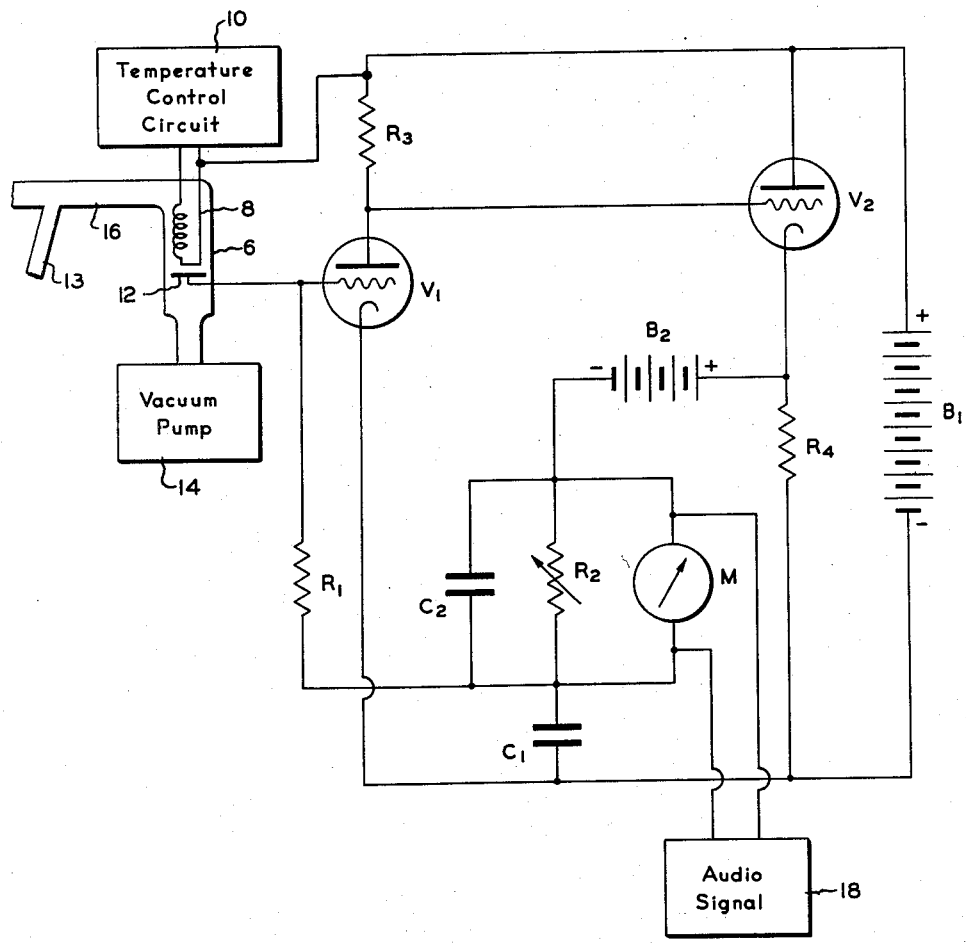
INVENTORS,
RICHARD B. LAWRANCE,
JONATHAN R. ROEHRIG
Oliver W. Hoyes
ATTORNEY

United States Patent Office 2,928,042
Patented Mar. 8, 1960

2,928,042

HIGH VACUUM DEVICE

Richard B. Lawrance, Cambridge, and Jonathan R. Roehrig, Sudbury, Mass., assignors to National Research Corporation, Cambridge, Mass., a corporation of Massachusetts Application December 6, 1955, Serial No. 551,258

6 Claims. (Cl. 324—33)

This invention relates to measuring and more particularly to vacuum leak detectors.

Halogen-sensitive leak detectors have recently been developed in response to the need for a cheap, accurate leak detector for numerous industrial applications. Such instruments have found only limited utility in the vacuum leak-detecting field. Since the halogen-sensitive leak detector operates on the principle of formation of positive ions (by a mechanism still not thoroughly understood) at the surface of a hot platinum surface, the gauge is very sensitive to changes in gas pressure and to changes in the temperature of the platinum surface. This is particularly true when the sensitivity of the instrument is made high so that it can be used as a vacuum leak detector to detect extremely small changes in the positive ion current resulting from the presence of very small quantities of a halogen leaking into a given system. Commercially available halogen-sensitive leak detectors designed for use under a reasonably high vacuum are subject to extreme difficulties in their operation which make them impractical for detection of very small leaks. While such commercially available leak detectors have often been advertised as having great sensitivity, as a general proposition, their usable sensitivity is not much above that obtained by the fairly common method of employing acetone and a standard hot-filament ionization gauge.

Accordingly, it is a principal object of the present invention to provide a halogen-sensitive leak detector, particularly adaptable for use in testing vacum systems, which has high sensitivity, high reliability and can be employed by relatively unskilled personnel.

Still another object of the invention is to provide a leak detector of the above type which is inexpensive to manufacture and simple to operate.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a schematic circuit diagram illustrating one preferred embodiment of the invention.

The phenomenon of positive ion emission has recently been the subject of considerable study (Proceedings of the Institute of Radio Engineers, 38 (8), 852–858 (August 1950)). Leak detectors based on this phenomenon utilize the observation that positive ion formation at a hot platinum surface is greatly enhanced by the presence of a halogen. This phenomenon apparently only occurs when alkali metal impurities are included in the platinum. These impurities (as atoms) apparently migrate to the platinum surface and become ionized only in the presence of a halogen. As sold commercially, the halogen-sensitive element consists of a diode having an indirectly heated platinum cathode and an ion-collector plate. The indicator circuit merely indicates the positive ion current. With no halogen gas present, there is a small ion current (5 to 10 microamperes) which will increase with the detection of the halogen. For very large proportions of halogen, the current will increase 10 to 20 times. However, when the instrument is to be used as a vacuum leak detector, particularly for small leaks, the indicator must indicate a change in current which is on the order of 0.1 microampere or less. Accordingly, the sensitivity of the instrument as a vacuum leak detector is entirely dependent on the ability of the instrument to measure a small ion current change. Measurement of such a small change would be no problem by itself except for the fact that a small change in the temperature of the platinum surface can double the no-vapor current. The same drastic change in no-vapor current also results from a relatively small change in the pressure. The pressure change reacts in two ways. First, it creates a change in platinum surface temperature (Pirani effect) and, secondly, it creates a change in the number of gas molecule ions which contribute to the no-vapor ion current (ion gauge effect). However, the pressure at which the gauge operates is not critical so long as it is reasonably stable and the vacuum system is not operating at complete blank-off.

In the normal use of such a halogen-sensitive vacuum leak detector, the halogen-sensitive element is connected to the system to be evacuated and the system is then pumped down to a pressure on the order of 100 mm. Hg abs. The outside of the evacuated system is then probed with a halogen-containing gas such as Freon-12 ($CCl_2F_2$) or —22. For a relatively small leak rate of about 0.06 micron cubic foot per hour, the time required for the probe gas to get to the leak detector may be on the order of 20 seconds. The ion current in the detector then increases to a maximum in about another 15 seconds, and subsequently upwards of 45 seconds is required for the ion current to return to its previous no-probe value. Since the desired signal resulting from the detection of the halogen probe gas is of exactly the same type, but enormously smaller in magnitude, than the signal resulting from the drift of the system due to changes in gas pressure or temperature of the platinum filament or surface, it is essential to differentiate between these types of signals.

This essential result has been achieved in the present invention by providing, in combination with an amplifier for amplifying the signals generated by the halogen-sensitive tube, a band pass filter which is arranged to pass, from the halogen-sensitive tube to an appropriate indicating means, substantially only those signals generated by the halogen-sensitive tube having a frequency greater than about 1 cycle per minute. Accordingly, the pressure in the vacuum system can be permitted to drift considerably (in fact, it is difficult to avoid such drift, since the system is preferably not operated at blank-off), and this drift will be ineffectual in giving a signal which can be mistaken for a signal corresponding to the detection of a probe gas.

In a preferred embodiment of the invention, the platinum filament or surface is preferably provided with a temperature control system so as to maintain the temperature thereof reasonably stable. In the preferred embodiment, the amplifier is preferably a high-gain D.C. amplifier with negative feedback. A preferred type of amplifier includes a narrow band pass filter in the feedback circuit. This permits amplification of "fast" (e.g., 1–2 cycles per minute) changes in ion current and indicates "slow" (less than 1 cycle per minute) changes without any amplification. The meter then indicates both the no-vapor current as a small, steady deflection (e.g., 10 percent of scale) and "fast" changes in ion current (due to the presence of halogen probe gas) as large swings of the meter needle. If desired, an audioalarm can be provided, the trigger for the audioalarm being arranged so that it automatically adjusts for the no-probe current. By this means, the audio alarm can be made to respond to a leak indication without regard to the existing base level of no-probe current.

Referring now to the drawing, there is illustrated one specific preferred embodiment of the present invention. The leak detector includes a halogen-sensitive diode 6 including a platinum cathode 8 and an ion collector plate 12. The cathode 8 is preferably arranged to be heated directly from a suitable platinum filament or surface temperature control 10 which can be a Wheatstone bridge. In a preferred embodiment of the invention employing the illustrated directly heated platinum cathode 8, this cathode is one arm of the Wheatstone bridge. The tube 6 is preferably arranged to be evacuated by means of a vacuum pump 14. This pump draws gas from the system under test into tubulation 16 so that the probe gas will pass between the cathode 8 and plate 12 and thus permit creation of the positive ions. The detected probe gas then is discharged from the halogen-sensitive diode 6 through pump 14. Under certain operating conditions, it is desirable to introduce a controllable auxiliary leak 13, which may be located as shown and which introduces a stream of pure air or non-halogen gas into the system. Such an auxiliary stream serves to establish an optimum operating pressure for the sensing element and is also useful as a purge.

The positive ion output current from the halogen-sensitive diode 6 is fed to an amplifier circuit including tubes $V_1$ and $V_2$. This amplifier is preferably a modification of the basic "Roberts" circuit (Review of Scientific Instruments, 10, 181–183 (1939)). In this circuit the output of the cathode follower tube $V_2$ is fed back to the bottom of the input resistor $R_1$ for the first-stage tube $V_1$. A very low frequency pass filter is employed in the feedback circuit by providing a time constant $R_2C_1$ on the order of 1 cycle per minute. Thus, signals having a frequency greater than about 1 cycle per minute are not fed back (with negative sign) to the first stage. This permits full amplification (about 100) of such "fast" signals. The amplified signals are applied to meter M and audioalarm circuit 18 due to the signal voltage generated across resistor $R_2$. Very fast pulses (noise) having a frequency above a few cycles per second are amplified but are preferably bypassed around resistor $R_2$ by the use of a shunt condenser $C_2$, which is considerably smaller than $C_1$. Accordingly, the "noise" signals do not energize meter M or audioalarm circuit 18. As a result of this arrangement, the audioalarm is activated only by signals having the frequency spectrum characteristic of a leak. It is insensitive to slow drifts of the ion current even though this ion current may increase greatly over a period of a few minutes. Equally, the audioalarm is shielded by this arrangement from extraneous "noise."

This amplifier circuit also includes power supply $B_1$, bias battery $B_2$, plate resistor $R_3$ and cathode resistor $R_4$. As shown, resistor $R_2$ is preferably made adjustable so that the time constant $R_2C_1$ can be adjusted to suit the particular type of leak being hunted. For example, if relatively large leaks are to be detected, it is preferred that a relatively fast time constant (e.g., 10–20 cycles per minute) be employed, since this permits fast recovery of the system to detect another leak after a first one has been detected. In a preferred embodiment of the invention, the capacitor $C_1$ comprises a "Miller effect" triode having a relatively small capacitor between the plate and grid thereof. The "Miller effect" is well described in, for example, "The Radiotron Designer's Handbook," F. Langford Smith, Ed., 4th Edition, Sydney, Wireless Press, 1952, page 52. Since the values of $C_1$ required for the desired filter characteristics are typically many tens of microfarads, it is advantageous in cost and stability to use a "Miller effect" capacitance multiplier rather than incorporating a full-size capacitor directly.

The temperature of the platinum cathode 8 in the halogen-sensitive diode 6 is preferably maintained at a temperature near 800° C. This can be conveniently adjusted by setting the temperature control at a level such that the unamplified current read by the meter is about 5 to 10 microamperes. This will give a temperature high enough for adequate sensitivity and also low enough so that the supply of alkali metal atoms in the platinum is not used up too fast.

While the invention has been described above in connection with preferred embodiments thereof, it should not be limited thereto. For example, numerous other time circuits can be employed, even mechanical or quasi-mechanical elements, in place of the $R_2C_1$ circuit illustrated. Similarly, the band pass filter need not be in the feedback path, although this is preferred. While an adjustable resistor $R_3$ has been illustrated as preferred for changing the time constant, it can be changed in other ways. Equally, resistor $R_2$ can be bypassed with a diode for permitting rapid discharge of capacitor $C_1$ and thus resetting the system very quickly so that it can again detect a leak.

Additionally, while the invention has been described in connection with its use as a leak detector for an evacuated system, it can also be used for detecting leaks in a system which is under a positive pressure of a halogen-containing gas. In this case, the tubulation 16 is replaced by a restricted passage, such as a long, small copper tube, which permits the maintenance by the vacuum pump of a pressure on the order of 1 mm. Hg. abs., even though the outer (open) end of the restricted passage is open to the atmosphere. The outer end of the restricted passage (e.g., the long copper tube) is then moved along a seam to be tested. Any halogen leaking through the seam will be picked up and carried into the region of the platinum surface.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. In a halogen-sensitive leak detector of the type wherein a positive ion current is obtained between a hot platinum surface and a collector in response to the probing of a halogen-containing gas by the hot platinum surface, said collector being maintained negative with respect to the platinum surface by means of a suitable potential source, the improvement which comprises means for at least partially evacuating a chamber containing the hot platinum surface and collector, means for maintaining the platinum surface at a relatively constant temperature, an amplifier connected to the collector and the hot platinum surface for amplifying electrical signals corresponding to the positive ion current, indicating means connected to the amplifier for indicating the detection of a leak, and a frequency selective circuit for rendering said amplifier inoperative to feed a controlling signal to the indicating means when said controlling signal has a frequency greater than a few cycles per second or less than about one cycle per minute.

2. In a halogen-sensitive leak detector of the type wherein an ion current is obtained in response to the probing of a halogen-containing gas by a halogen-sensitive tube containing a platinum surface and an ion collector, said collector being maintained negative with respect to the platinum surface by means of a suitable potential source, the improvement which comprises the combination of an amplifier connected to the collector and the hot platinum surface for amplifying signals generated by the halogen-sensitive tube, a negative feedback path for the amplifier, a time delay network in the feedback path for preventing feedback of signals having a frequency higher than about one cycle per minute, means coupled to the output of the amplifier for indicating the presence of only those signals which are amplified by the amplifier with full gain, and means for bypassing high-frequency signals around the indicating means.

3. In a halogen-sensitive leak detector of the type wherein an ion current is obtained in response to the probing of a halogen-containing gas by a halogen-sensitive tube containing a platinum surface and an ion collector, said collector being maintained negative with respect to the platinum surface by means of a suitable potential source, the improvement which comprises the combination of an amplifier connected to the collector and the hot platinum surface for amplifying signals generated by the halogen-sensitive tube, a negative feedback path for the amplifier, a time delay network in the feedback path for preventing feedback of signals having a frequency higher than about one cycle per minute, and means coupled to the output of the amplifier for indicating the presence of only those signals which are amplified by the amplifier with full gain.

4. In a halogen-sensitive leak detector of the type wherein a positive ion current is obtained in response to the probing of a halogen-containing gas by a hot platinum surface, the improvement which comprises means for at least partially evacuating a tube containing the hot platinum surface and a positive ion collector, said collector being maintained negative with respect to the platinum surface by means of a suitable potential source, means for maintaining the platinum surface at a relatively constant temperature, an amplifier connected to the collector and the hot platinum surface for amplifying electrical signals corresponding to the positive ion current, and means for eliminating variations in signal current which have a frequency greater than and less than a small selected band of frequencies ranging from about a few cycles per second to a few cycles per minute.

5. In a halogen-sensitive leak detector of the type wherein a positive ion current is obtained in response to the probing of a halogen containing gas by a halogen-sensitive tube containing a hot platinum element and a collector for positive ions which is maintained negative with respect to the platinum element by means of a suitable potential source, the improvement which comprises means connecting the collector and hot platinum element with an amplifier for signals corresponding to the positive ion current generated by the probing of a halogen containing gas, an indicating means connected to the output of the amplifier, and means associated with the amplifier for preventing full gain amplification of positive ion signals having a frequency substantially less than about 1 cycle per minute.

6. In a halogen-sensitive leak detector of the type wherein a positive ion current is obtained in response to the probing of a halogen containing gas by a halogen-sensitive tube containing a hot platinum element and a collector for positive ions which is maintained negative with respect to the platinum element by means of a suitable potential source, the improvement which comprises means connecting the collector and hot platinum element with an amplifier for signals corresponding to the positive ion current generated by the probing of a halogen-containing gas, an indicating means connected to the output of the amplifier, means associated with the amplifier for preventing full gain amplification of positive ion signals having a frequency substantially less than about 1 cycle per minute, means providing a small leak for feeding halogen-free gas into said tube to sweep halogen-containing gas away from the platinum surface, and a supply of halogen-free gas connected to said leak.

References Cited in the file of this patent

UNITED STATES PATENTS

| | | |
|---|---|---|
| 2,550,498 | Rice | Apr. 24, 1951 |
| 2,579,352 | White | Dec. 18, 1951 |